Patented Aug. 1, 1933

1,920,340

UNITED STATES PATENT OFFICE 1,920,340

MANUFACTURE OF COATED PAPERS

Frank William Bailey, Sydney Francis William Crundall, and Howard Spence, Manchester, England, assignors to Peter Spence & Sons, Limited, Manchester, England No Drawing. Application July 28, 1931, Serial No. 553,684, and in Great Britain August 1, 1930

6 Claims. (Cl. 91—68.)

It is known to use calcium sulphate in hydrated and anhydrous forms for many purposes in the arts, e. g., as a filler for paper etc., but it has not hitherto been found suitable for use as a pigment in the preparation of the "colour" or "enamel" for the manufacture of coated or art papers.

We have now found that anhydrous calcium sulphate in finely divided and close textured form may be economically used to obtain high quality and improved results in respect of colour, finish and other desirable properties in the manufacture of coated papers, and our invention consists in the preparation of coated or art papers or the like with the employment of such finely divided and close textured anhydrous calcium sulphate.

In carrying our invention into effect we prepare a coating mixture by known means, substituting the finely divided anhydrous calcium sulphate, e.g., that obtained by the method described in the specification of British Patent No. 319,228, either in part or wholly for the barium sulphate or other pigment that would ordinarily be used, and proceed to coat the paper with such mixture by known means. We find that the adhesives ordinarily used, e.g., casein, gelatine, etc. are suitable for use with coating mixtures containing the finely divided anhydrous calcium sulphate and that the coating mixtures so prepared flow evenly, work well on the coating machine and give a particularly solid coating. When the finely divided anhydrous calcium sulphate is used in admixture, e.g., with china clay, we find that the colour and finish of the coated paper are superior to those obtained with corresponding proportions of blanc fixe or barium sulphate or other similar commonly used pigment and china clay, or that we may obtain equally good colour and finish to those given by other mixtures with lower proportions of the finely divided anhydrous calcium sulphate to china clay. Thus, for example, we may use as the pigment in a coating mixture a mixture of equal parts of china clay and the finely divided anhydrous calcium sulphate and obtain results equal to those given by a mixture of two parts of the best quality blanc fixe and one part of china clay. We find that the finish obtained in the usual way by calendering is suitable for a dull enamel and that by suitable treatment, for example, by brushing and calendering, a finish substantially equal to that given by satin white may be obtained.

What we claim as our invention and desire to secure by Letters Patent is:—

1. A pigment for a paper coating composition consisting of clay as a filler pigment and anhydrous calcium sulphate.

2. A pigment for a paper coating composition consisting of china clay and anhydrous calcium sulphate.

3. A pigment for a paper coating composition consisting of equal parts of china clay and anhydrous calcium sulphate.

4. The process for the manufacture of coated papers, which process comprises applying to the surface of a sheet of paper a coating composition containing a pigment consisting of clay as a filler pigment and anhydrous calcium sulphate as a color pigment.

5. The process for the manufacture of coated papers, which process comprises applying to the surface of a sheet of paper a coating composition containing a pigment consisting of china clay and anhydrous calcium sulphate.

6. The process for the manufacture of coated papers, which process comprises applying to the surface of a sheet of paper a coating composition containing a pigment consisting of equal parts of china clay and anhydrous calcium sulphate.

FRANK WILLIAM BAILEY.
SYDNEY FRANCIS WILLIAM CRUNDALL.
HOWARD SPENCE.